(12) United States Patent
Belkin et al.

(10) Patent No.: US 7,146,158 B2
(45) Date of Patent: Dec. 5, 2006

(54) METHOD AND APPARATUS FOR REFORMATTING DIALED NUMBERS

(75) Inventors: Anotoly S Belkin, Glenview, IL (US); Peter P Hux, Downers Grove, IL (US); Ajaykumar R Idnani, Schaumburg, IL (US); Jheroen P Dorenbosch, Paradise, TX (US); Niranjan N. Segal, Arlington, TX (US); Zaffer S Merchant, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 117 days.

(21) Appl. No.: 10/714,077

(22) Filed: Nov. 14, 2003

(65) Prior Publication Data

US 2005/0105497 A1    May 19, 2005

(51) Int. Cl.
*H04M 3/42* (2006.01)
*H04M 1/00* (2006.01)
*H04Q 7/20* (2006.01)

(52) U.S. Cl. ............... 455/414.1; 455/550.1; 455/552.1; 455/445

(58) Field of Classification Search ........... 455/564, 455/414.1, 445, 435.2, 417, 552.1, 550.1
See application file for complete search history.

(56) References Cited

U.S. PATENT DOCUMENTS

| | | | | |
|---|---|---|---|---|
| 5,559,862 A | * | 9/1996 | Bhagat et al. ............... 455/460 |
| 5,963,863 A | * | 10/1999 | Berggren ..................... 455/445 |
| 6,125,281 A | * | 9/2000 | Wells et al. .................. 455/466 |
| 6,490,449 B1 | * | 12/2002 | Thibert et al. ............... 455/433 |
| 6,748,217 B1 | * | 6/2004 | Hunzinger et al. ......... 455/435.2 |
| 2002/0013163 A1 | * | 1/2002 | O'Prey ....................... 455/558 |
| 2002/0097855 A1 | | 7/2002 | Neudeck et al. ........ 379/201.01 |
| 2002/0101858 A1 | * | 8/2002 | Stuart et al. ................ 370/352 |
| 2002/0137499 A1 | | 9/2002 | Lai et al. .................... 455/418 |
| 2002/0137549 A1 | | 9/2002 | Porter ........................ 455/563 |
| 2002/0160815 A1 | * | 10/2002 | Patel et al. ................. 455/564 |
| 2002/0173300 A1 | | 11/2002 | Shtivelman et al. ........ 455/418 |
| 2003/0100334 A1 | * | 5/2003 | Mazzara, Jr. ............... 455/552 |
| 2004/0042613 A1 | * | 3/2004 | Phillips ...................... 379/350 |
| 2006/0068786 A1 | * | 3/2006 | Florence .................. 455/435.2 |

FOREIGN PATENT DOCUMENTS

| | | |
|---|---|---|
| EP | 0530010 A2 | 8/1992 |
| EP | 0530010 B1 | 5/1998 |
| EP | 0969642 | 5/2000 |
| WO | WO97/42781 | 5/1997 |
| WO | WO98/20663 | 10/1997 |
| WO | WO01/03407 A1 | 1/2001 |

* cited by examiner

Primary Examiner—Lester G. Kincaid
Assistant Examiner—Marisol Figueroa
(74) Attorney, Agent, or Firm—Simon B. Anolick

(57) ABSTRACT

A wireless communication unit (101) is operable to reformat dialed numbers according to dialing plans for a plurality of communication networks (103, 107, 109), where the unit comprises a transceiver (201) for communicating with any of the plurality of communication networks; a user interface (211) operable to provide a number corresponding to a target unit (102, 102') to be called; and a controller (209) implementing a corresponding method to provide a reformatted number (FIG. 3) corresponding to the number and according to a preference that is specific to the wireless communication unit, where the reformatted number is compatible with a dialing plan for a communication network that will be used to place a call to the target unit.

20 Claims, 5 Drawing Sheets

| DIGITAL PATTERN | ENTERPRISE (WLAN) | CARRIER (WAN) |
|---|---|---|
| 2-XXXX | NO CHANGE | PREPEND 1-847-63 |
| 5-XXXX | NO CHANGE | PREPEND 1-847-43 |
| 6-XXXX | NO CHANGE | PREPEND 1-847-57 |
| 8-XXXX | NO CHANGE | PREPEND 1-847-53 |
| 911 | REPLACE 6-2222 | NO CHANGE |
| 3-XXXX | PREPEND 91-954-72 | PREPEND 1-954-72 |
| 1-900-XXX-XXXX | BLOCK | BLOCK |

METHOD AND APPARATUS FOR REFORMATTING DIALED NUMBERS

FIELD OF THE INVENTION

This invention relates in general to communication systems, and more specifically to a method and apparatus for reformatting dialed numbers for compatibility with dialing plans of communication networks.

BACKGROUND OF THE INVENTION

Communication units or other units that are capable of operating on a plurality of communication networks are becoming more common. There are situations where different communication networks that can provide service for the communication unit can have different dialing plans. For example, one network may require 10 digits for routing. Another network may be a local network, such as used in an enterprise, and may require only 3, 4, or 5 digits for routing within the network.

This can create problems or inconveniences for a user of a communication unit. For example, placing a call to an individual may require that a user know which of several communication networks is being utilized in order to provide a number that is compatible with the dialing plan for that network. This can result in excessive memory being used for phone books when multiple entries are needed for each associate. Techniques exist for appending, for example, an area code, but these techniques usually rely on operating within a given network, albeit a different portion of the network and do not address situations where diverse networks are available for service or situations where a dialed number is ambiguous. A need exists for improved methods and apparatus for reformatting dialed numbers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENT

Figure 1:
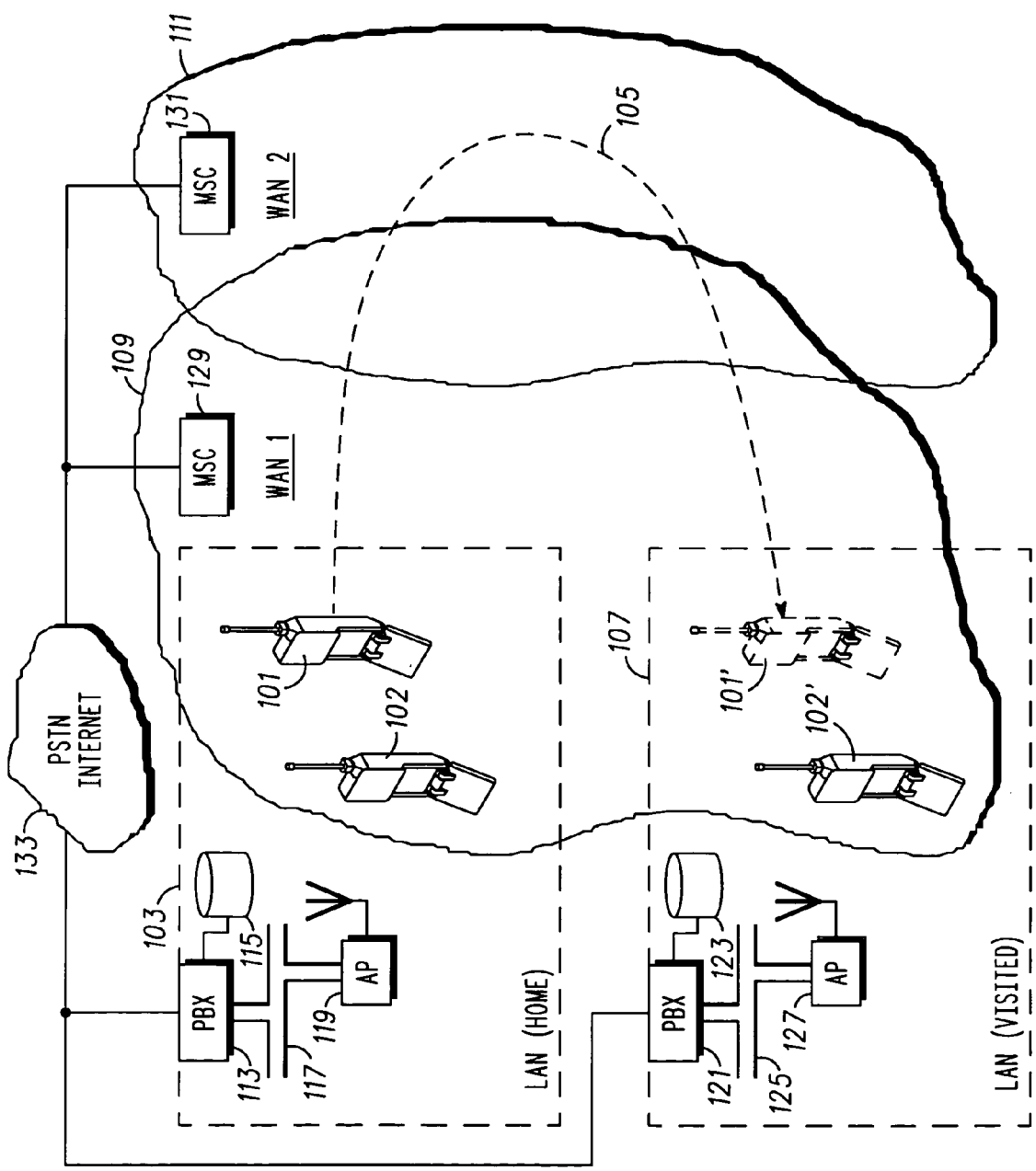
FIG. 1 depicts, in a simplified and representative form, a system or environmental diagram of a plurality of communication networks and interconnections thereof.

In overview, the present disclosure concerns communication systems or networks and communication units that are operable on more than one communication network and more particularly wireless communication units or devices operable on multiple networks when these communication networks have differing caller identification formats.

The principles discussed are applicable to many communication systems or networks and communication units, including those units operable on different networks with different caller identification formats or dialing plans, such as when one network is a public wireless carrier or wireless wide area network (WAN), such as a cellular service carrier, and the other network is a private communication system as supported, for example, on a corporation's enterprise wireless local area network (LAN).

As further discussed below various inventive principles and combinations thereof are advantageously employed to ensure that a communication unit capable of providing a user with service on multiple communication networks correctly formats numbers corresponding to a target unit, such as a dialed number or number from a phone book, so that valid call addressing or routing is achieved when making calls while moving between or operating on such communication networks, provided these principles or equivalents thereof are utilized.

Note that the term communications unit may be used interchangeably herein with wireless subscriber device, subscriber device or subscriber unit, and each of these terms denotes a device ordinarily associated with a user. Examples of such units include personal digital assistants, personal assignment pads, personal computers equipped for wireless operation, cellular handsets or devices, or equivalents thereof.

The communications units that are of particular interest are multi mode units capable of providing or facilitating both short range communications capabilities, normally referred to as wireless LAN capabilities, via wireless LANs using for example protocols such as IEEE 802.11, Bluetooth, or Hiper-Lan and the like, as well as conventional wireless or cellular communications capabilities, via wireless WANs using protocols such as code division multiple access (CDMA), frequency hopping, or time division multiple access (TDMA) technologies and one or more of various networking protocols, such as Transmission Control Protocol/Internet Protocol (TCP/IP), protocols such as H.323 and Session Initiation Protocol (SIP) that support Voice Over Internet Protocol (Voice Over IP), Inter-Packet Exchange/Sequential Packet Exchange (IPX/SPX), Network Basic Input Output System (Net BIOS), GSM, UMTS, Wideband CDMA, or other protocol structures.

The present disclosure is provided to further explain in an enabling fashion the best modes of making and using various embodiments in accordance with the present invention. The disclosure is further offered to enhance an understanding and appreciation for the inventive principles and advantages thereof, rather than to limit the invention in any manner. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs or processors. It is expected that one of ordinary skill, when guided by the concepts and principles disclosed herein, will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Referring to FIG. 1, a simplified and representative system or environmental diagram of a plurality of communication networks and interconnections thereof will be discussed and described. It is expected that this discussion will establish some linguistic conventions as well as lay the foundation for a deeper appreciation for the principles and concepts that will be described in more detail with reference to further figures. A wireless communication unit 101 is able to send and receive or exchange communication such as voice and data with a multiplicity of target units 102, 102' over a plurality of communications networks, such as a first communication network 103. This communication unit 101 is mobile or portable and can travel via path 105 to another location with service from a second communication network 107 (depicted with ghost image 101') and while so doing will be within service areas for and be able to obtain service from various other communication networks, such as WAN1 109 and WAN2 111.

The first and second communication networks in some embodiments are wireless or includes portions of a wireless LAN and will alternatively be referred to as a wireless home LAN or home LAN 103 and a wireless visited LAN or visited LAN 107 in some of the discussions below. These wireless LANs are typically operating in accordance with some version of IEEE 802, such as 802.11a, 802.11b, 802.11g or perhaps HiperLan protocols and access technologies with higher level session management tasks in accordance with Session Initiation Protocol (SIP) or H.323 conventions. The wireless LAN 103, 107 includes, respectively, a Private Branch Exchange (PBX) 113, 121 that in certain embodiments is an IP PBX coupled to a database 115, 123 and a wired backbone 117, 125 such as an Ethernet in accordance with IEEE 802.3 conventions as well as a plurality of access points 119, 127 that support the wireless LAN functionality in a known manner. Various other network entities such as servers, wired devices or units, routers, SIP registrars, collectors, firewalls, and the like are not shown but will be appreciated by one of ordinary skill to be present.

The wireless WANs may be ordinary "cellular" wide area networks operating in accordance with one or more known cellular protocols and standards. The wireless WANs, specifically WAN1 109 and WAN2 111 are respectively managed by a mobile switching center 129, 131. The WANs include various additional entities, such as a radio access network with base stations, antenna towers, base site controllers as well as other apparatus and functionality such as home location registers, billing processors, etc that is not shown but will be understood to be present by one of ordinary skill. The various WANs and wireless LANs via respective PBXs and MSCs, are inter coupled by one or more public networks 133, such as the PSTN or Internet. The various network entities noted above are available from various suppliers and will not be further discussed. Furthermore the concepts and principles disclosed herein are also applicable to more tightly coupled systems where the wireless LAN does not use a PBX but rather a device that looks like a PBX or other local switch to the LAN and an MSC to the WAN1 and WAN2.

It should be noted that on many occasions wireless communication units, such as unit 101 will be able to obtain service from a plurality of communication networks at any one time. For example, as depicted in the simplified diagram, unit 101 is within range or the service area of the first network 103 as well as WAN1 109 and typically there will be additional networks that are available to provide service. Which communication network is used for service may be somewhat at the discretion of the communication unit 101 or user thereof. Furthermore these different networks can and some likely do have different dialing plans, where a dialing plan is a description of numbers that are presented by communications units, such as a dialed number (including phone book numbers or other numbers from a units memory) that can be routed or resolved to a particular target unit, such as another wireless or wired device according to routing conventions of the particular network.

Note that a given number that is resolvable in one network may not be routable in another and in fact there may not be any way to resolve the routing issue within the other network absent further information. Numbers that can be routed or resolved according to the dialing plans of two different networks will not necessarily go to the same target unit and these numbers are thus ambiguous when presented to these different networks. For example abbreviated dialing where a number may be routable within one wireless LAN or enterprise network is likely not routable within an external or other network and at best can be ambiguous if the routing rules of the other network are used. In any event these and other issues can all serve as a significant inconvenience for a user of a wireless communications unit that visits different networks. Solutions to some of these issues are the focus of the concepts and principles that will be disclosed, reviewed and discussed below.

Figures 2, 3:
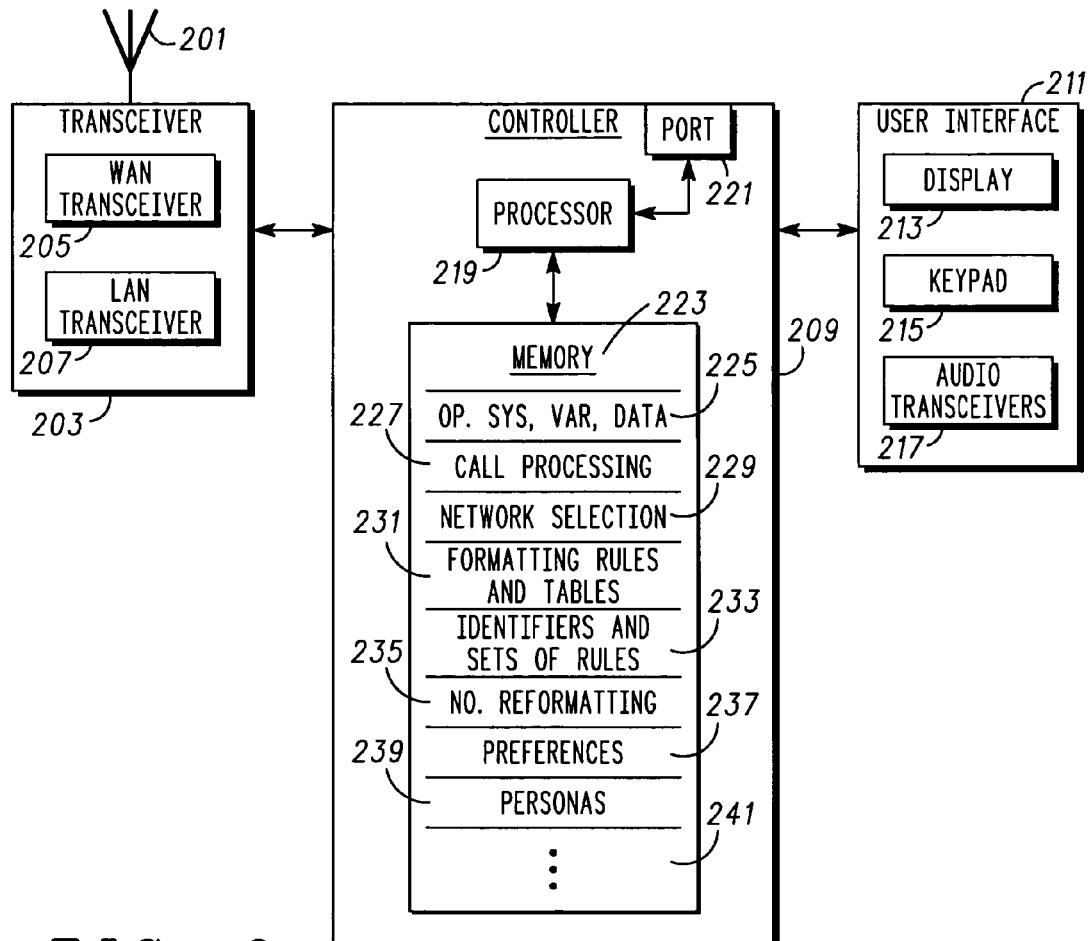
FIG. 2 depicts, in a simplified and representative form, a block diagram of a wireless communication unit for reformatting numbers.
FIG. 3 depicts, a simplified and representative table representative of dialing plans for different communication networks.

Referring to FIG. 2, a simplified and representative block diagram of a communication unit, such as unit 101 that is arranged and constructed to reformat or for reformatting a number, such as a dialed number will be discussed and described. The communication unit is structurally similar or identical to communication units, such as wireless handsets, available from manufacturers like Motorola, however the functionality of these units will need to be modified according to the principles and concepts disclosed and described herein in order to enjoy the advantages noted. The communication unit includes an antenna 201 coupled to a transceiver 203. The transceiver 203 is composed of at least one transmitter/receiver but may as depicted be comprised of one or more WAN transceivers 205 (one shown) and one or more additional wireless LAN transceivers 207 (one shown). In one embodiment, one transmitter/receiver 205 is for communicating over a wide area network (WAN) while another transmitter/receiver 207 is for communicating over a wireless local area network. These transceivers and their functionality are generally known and whether embodied as one or several transceivers will depend on the air interface technologies utilized in the specific WANs and LANs that the communication unit is configured to interface to or interact with.

The transceiver 203 is coupled to a controller 209 and the controller is further coupled to a user interface 211. The controller 209 provides over all control for the communication unit, call processing, and interfacing tasks associated with the transceivers and user interface. The user interface includes a conventional display 213, a keyboard or keypad 215, audio transducers 217, and the like. The controller 209 further comprises a processor 219, a port 221 for interfacing to other devices and a memory for storing software instructions and other information all inter coupled as depicted. The processor is comprised of one or more general purpose processors and digital signal processors available from various suppliers, including Motorola. The memory 223 can include both volatile and non-volatile memory and can be at least in part integral to the processor 219 or may also be external.

The memory includes various software programs and data including an operating system with variables and data 225 that when executed by the processor results in the controller performing the above generally identified duties as well as those tasks described below in conjunction with other routines. The other routines include call processing routines 227 that are known and will vary with the specific requirements of the networks that are being utilized for service. Other routines and databases will be listed and their respective functionality will become evident with the detailed explanations below. These routines include network selection 229, formatting rules and tables 231, identifiers and sets of formatting rules 233, number reformatting 235, network and user preferences 237, personas 239, and various other routines and databases 241, such as phone books, user interface drivers, and various applications, that are not further relevant but that will be evident to one of ordinary skill.

In operation, the communication unit 101 is, as discussed above, capable of operating on more than one communication network, such as wireless LANs 103, 107 and wireless WANs 109, 111. The communication unit is free to roam between coverage areas of the various communication networks such that it may not be obvious to the user of the unit which communication network will be used to make an outbound call. At the same time it is important that a dialed number be compatible with the dialing plan of the network being used and also that the number be non ambiguous, e.g. result in the proper target device or unit being contacted.

In one embodiment, the wireless communication unit is operable to reformat dialed numbers according to dialing plans for a plurality of communication networks. The wireless communication unit comprises the transceiver 203 that is configured to communicate over a wireless LAN 103, 107 and over a wireless WAN 109, 111 and the user interface 211 that is operable to provide a number corresponding to a target unit 102, 102' to be called, where the number can be a dialed number including, for example, a number entered at the user interface, recalled from a phone book or other memory area, such as last dialed or called numbers or the like. Given the number, the controller 209 is configured to select one of the wireless LAN and the wireless WAN as a communication network that will be used to place a call to the target unit; to obtain formatting or reformatting rules corresponding to a dialing plan for the communication network; and to reformat the number according to the reformatting rules to provide a reformatted number that is compatible with the dialing plan for the communication network that will be used to place the call to the target unit.

Selecting the network can be based on preferences for what network is used. In some embodiments the controller selects the communication network from a plurality of communication networks, where the communication network is one of the plurality of communication networks that is available to provide service for the wireless communication unit. For example, often if the unit is able to register with a wireless LAN and that wireless LAN is the units home LAN, such as depicted with LAN 103 and communication unit 101 and the target unit is within the home LAN 103, for example communication unit 102, the home LAN 103 may be preferred and the appropriate communication network to select. However, in a number of situations the home LAN may not be the appropriate communication network to select to place a call to the target unit.

For example, if the wireless communication unit 101 is not within the home LAN and is instead out of range of that network, e.g. during portions of the trip along path 105 it will likely prefer and choose or select one of a plurality of WANs that may be available to provide service. If the communication unit is located at a visited LAN 107, shown as ghost unit 101' it likely can choose between a WAN and the visited LAN for the communication network. If the target unit is not within the home LAN, for example, target unit 102' located in the visited LAN 107 or if the target unit is not within any wireless LAN, the communication unit may prefer to select a WAN as the communications network. The nature of the call to the target unit (personal vs. business) can affect the selection of the network with personal calls suggesting use of a WAN and business calls making use of a local enterprise wireless LAN. Services that may be required such as levels of security or monitoring that may be expected may play a role in selecting a network. These are a few of the situations or circumstances where a different network may be preferred and can be chosen or selected as the communication network to place a call to the target unit.

Various other factors may affect the selection in addition to those circumstances noted above. For example, relevant differential tariffs for the communications unit and the target unit, user convenience, e.g. whether the user has or has ready access to appropriate numbers or other rules such as reformatting rules for the relevant network given the particular target unit, general information about the target units location, e.g. within a wireless LAN or within a WAN, a persona currently active for the user, are some of the factors that can be considered. In any event given the relevant concerns and preferences 237 one of ordinary skill can develop the network selection routine 229 and this routine will then facilitate the selection of the communication network, providing user prompts if necessary and so forth.

Obtaining formatting rules corresponding to a dialing plan for the communication network that was selected can take various forms as well. In general, the memory 223, specifically the formatting rules and tables portion 231, is arranged to store the formatting or reformatting rules. The controller, having selected a network, chooses rules indexed according to an identifier that corresponds to a set of or table of the reformatting rules. There can be circumstances where a user may be prompted to choose an identifier using the user interface. For example, target units 102 and 102' may have identical abbreviated numbers, for example 345, that are readily routable within their respective LANs. However, when the number abc is provided, what or what set of reformatting rules to apply will depend not only on the selected network but also on what target unit is intended and this can be resolved with a user input or user selection of the identifier. Given the identifier that was chosen by the user the controller can select a proper set of formatting rules that correspond to the communication network.

In any event, the formatting rules can be obtained for storing in the memory by, for example, user entry at the user interface, a table of rules provided via the port 221 during configuration of the wireless communication unit, a configuration file provided by the communication network or each of the plurality of communication networks at, for example, registration with the communications network, or combinations of each of these approaches. It is expected that obtaining the formatting rules may occur over a period of time and these rules may be updated from time to time. Thus in some embodiments the memory will include a plurality of sets of formatting rules and the controller will select one of these sets of formatting rules that corresponds to the communication network to be used for placing the call.

Reformatting the number to provide the reformatted number, given the reformatting rules, is accomplished by the controller applying the formatting rules to the number using the number reformatting routine 235. The reformatted number can take various forms including for example, the number with one or more digits deleted, one or more digits added, or one or more digits substituted. In addition, in some embodiments, the reformatted number will result from applying an algorithm to the number, such as adding the number to a base number, e.g. 123-456-1111 is added to an abbreviated number such as 7654. In other situations, an access number is retrieved from the communication unit memory or from some communications network and the number or abbreviated number is appended as an over dial suffix to provide the reformatted number. In yet other embodiments, the number is used as an index to a look up table in, for example, the memory 223 at the table location 231, with the reformatted number being the value stored in the table at the location identified by the number. Note that the number in this situation could be any alphanumeric string that points, for example, to a fully routable entry, such as a SIP address or number (commonly referred to as a fully qualified specifier in SIP parlance), e.g. reformatted number, in the table.

Referring to FIG. 3, a simplified and representative table, representative of dialing plans for different communication networks will be discussed and described, by way of example. This table is indicative of the substantive content that can be expected to be included in the portions of the memory 223 designated 231, 233. The column headed by DIGITAL PATTERN represents possible numbers or dialed numbers that may be presented at the communication unit, e.g. to the controller 209, where each X is any alpha numeric digit, typically a numeric digit, comprising 0–9. When the communication unit is in or operating within a particular wireless LAN, such as a home wireless LAN 103 or home enterprise system (communication network has been selected to be the home wireless LAN), the entries in the second column represent the reformatted number. In this instance for abbreviated numbers, such as 5 digit numbers beginning with 2, 5, 6, or 8, the number can be used as the reformatted number. Note, that a complete number including the home network digits (area code and office code), such as 847-632-xxxx could also normally be used to route the 5 digit 2-xxxx within the relevant wireless LAN. In contrast a 5 digit number beginning with 3 cannot be routed within the wireless LAN or at least the formatting rules reflected in the table indicate that the number is prepended with 91-954-72 to provide a reformatted number 91-954-723-xxxx. The resultant number or reformatted number will be used by the wireless LAN PBX to route the call out of the wireless LAN, "9", to a target unit identified by the full 11 digit number. Numbers, such as 911, e.g. signifying an emergency, are replaced by a local wireless LAN emergency response number as the reformatted number, for example, 6-2222 and numbers such as 1-900 . . . numbers are simply blocked, e.g. not routed.

However, if the same numbers or dialed numbers are presented and the communications network that has been selected is a WAN or WAN carrier, different formatting rules are applied. In particular for each unique 5 digit pattern or number a different 1+10 digit reformatted number is provided as indicated. Thus in general for these situations, when the communication network is an external wireless network, such as a WAN, and the number is, for example an abbreviated number that is compatible with the dialing plan of another wireless communication network, such as the home wireless LAN, a visited wireless LAN, or another WAN, the controller of the wireless communication unit can append digits to the number so the reformatted number can be used to route the call to the other wireless communication network. Numbers such as 911 are not changed if the communications network is WAN and 1-900 . . . numbers are still blocked. It is important to understand that the table or sets of formatting rules indicated by FIG. 3 can be expanded in various dimensions and manners. For example, different rules could apply to additional wireless LANs or enterprise systems or different WANs and this would expand the table in the horizontal direction adding additional columns. The table can also be expanded in the vertical direction with additional rules including for example conditional rules, covering, for example, situations where a number is compatible with multiple communications networks, e.g. is ambiguous or can not be resolved. This may result in a prompt to a user that requests some indication of the user intent or preference(s) (discussed further below). Suffice it to say that the table or formatting rules and thus dialing plans indicated by each column indicated by the table can be extensive and largely bounded only by the users objectives or imagination.

Referring to FIG. 1-3 some other circumstances that can be presented to the communications unit will be discussed and reviewed. For example, when the communication network is an external wireless network, such as the WAN 109, and further when the number is an abbreviated number that is compatible with the dialing plan of a recently visited wireless LAN and is compatible with a dialing plan for a home wireless LAN, the communication unit, specifically the controller 209, can rely on a preference 237 to provide the reformatted number according to one of the dialing plan of the recently visited wireless LAN and the dialing plan of the home wireless LAN so the reformatted number can be used to route the call to a respective one of the recently visited wireless LAN and the home wireless LAN. Note that the recently visited wireless LAN can be the visited LAN 107 or similar wireless LAN. Thus if the number or dialed number is ambiguous, e.g. the same number, e.g. 4567, and is routable within two distinct communication networks, such as the home and the recently visited wireless LANs or the recently visited wireless LAN and another previously visited wireless LAN, the controller will not be able to determine what set of formatting rules to apply absent additional information, such as the intent or preferences of the user.

This preference can consider a variety of circumstances or be based on different circumstances, such as one or more of a rule stored in the memory, an indication from a user as a result of a prompt generated by the controller, an elapsed time since the recently visited wireless LAN was the communication network, the relative proximity of the recently visited wireless LAN and another LAN or WAN, and so on. The rule can implement a preference such as when an ambiguous number is presented always reformat the number to route the number to a given communication network. For example if the number is ambiguous provide a reformatted number that will route the call to a target unit within the home LAN is one rule. Another rule for such situations is reformat the number to route the call to a target unit in the visited wireless LAN. In each case the area code and office code and so forth that correspond to the proper LAN would be added to the number so that the call is routed to the proper network.

The preference can also be conditional, e.g. reformat the number to route the call to the last wireless LAN, such as the home wireless LAN or visited wireless LAN, that was the communication network if the elapsed time since the LAN was the communication network is less than N hours. Another example of a conditional preference is the dependence upon the proximity of the wireless LAN, such as home or visited wireless LAN. In this instance reformat the number to route the call to the last wireless LAN that was the communication network if that network is less than some distance removed from the present location of the wireless communication unit. If the wireless communication unit includes a GPS receiver or has access to location coordinates, for example from the present communication network, and knows the general coordinates of the last wireless LAN this distance or proximity limitation can be specified. The proximity can also be generally determined using for example cell site identification information that is normally available in WANs. With this approach, when the communication unit 101 is within a few cell sites of the home wireless LAN 103, such as on a trip home or other local trip, and dials a number that happens to be equal to a number for a colleague or acquaintance, such as unit 102', within the visited wireless LAN 107, the number would still be reformatted by adding the area code and office code or whatever code may be required to route the call to, for example, the target unit 102 within the home LAN.

Thus, for example, when the communication unit is at the visited wireless LAN location and the communication network is the visited wireless LAN and further when the number is an abbreviated number that is compatible with a dialing plan of an other wireless communication network, e.g. a WAN or the home wireless LAN, and not compatible with a dialing plan of the visited wireless LAN, the controller appends digits to the number so the reformatted number can be used to route the call to the other wireless communication network. However given the same location and communication network, when the abbreviated number is compatible with a dialing plan of the visited wireless LAN and is further compatible with the dialing plan of the other wireless communication network, the controller relies on a preference to provide the reformatted number according to one of the dialing plan of the visited wireless LAN and the dialing plan of the other wireless communication network so the reformatted number can be used to route the call within a respective one of the visited wireless LAN and the other wireless communication network, such as the wireless home LAN.

As briefly suggested above the wireless communication unit, specifically controller, given the number is an abbreviated number and when the abbreviated number is not compatible with a dialing plan for the communication network can use other techniques to provide an appropriate reformatted number. For example, the controller can operate to provide the reformatted number by applying an algorithm to the abbreviated number or retrieving an access number from memory or perhaps from the or another communication network and appending the abbreviated number as an over dial suffix. The access number would be called and the number over dialed using DTMF and appropriately routed as a result. This would allow changes in rules to be applied or all numbers that are not resolvable to get assistance or a uniform message and so forth. Another alternative is retrieving a stored number from a look up table that is indexed according to the abbreviated number as the reformatted number. This table can be stored within the memory of the communication unit and updated as the user sees fit. Furthermore, the retrieved number can be a fully compatible E.164 number that is resolvable regardless of the units location, etc.

Thus in one embodiment, a wireless communication unit has been disclosed that is operable to reformat dialed numbers according to dialing plans for a plurality of communication networks. The wireless communication unit comprises a transceiver for communicating with any of the plurality of communication networks; a user interface operable to provide a number corresponding to a target unit to be called; and a controller, coupled to the transceiver and the user interface, to provide a reformatted number corresponding to the number and according to a preference that is specific to the wireless communication unit, where the reformatted number is compatible with a dialing plan for a communication network that will be used to place a call to the target unit. In this embodiment of the communication unit much of the additional detail noted above, such as the particular preferences, etc can also be applied to decide amongst reformatting rules for use for providing the reformatted number and thus will not be specifically repeated here.

Figure 4:
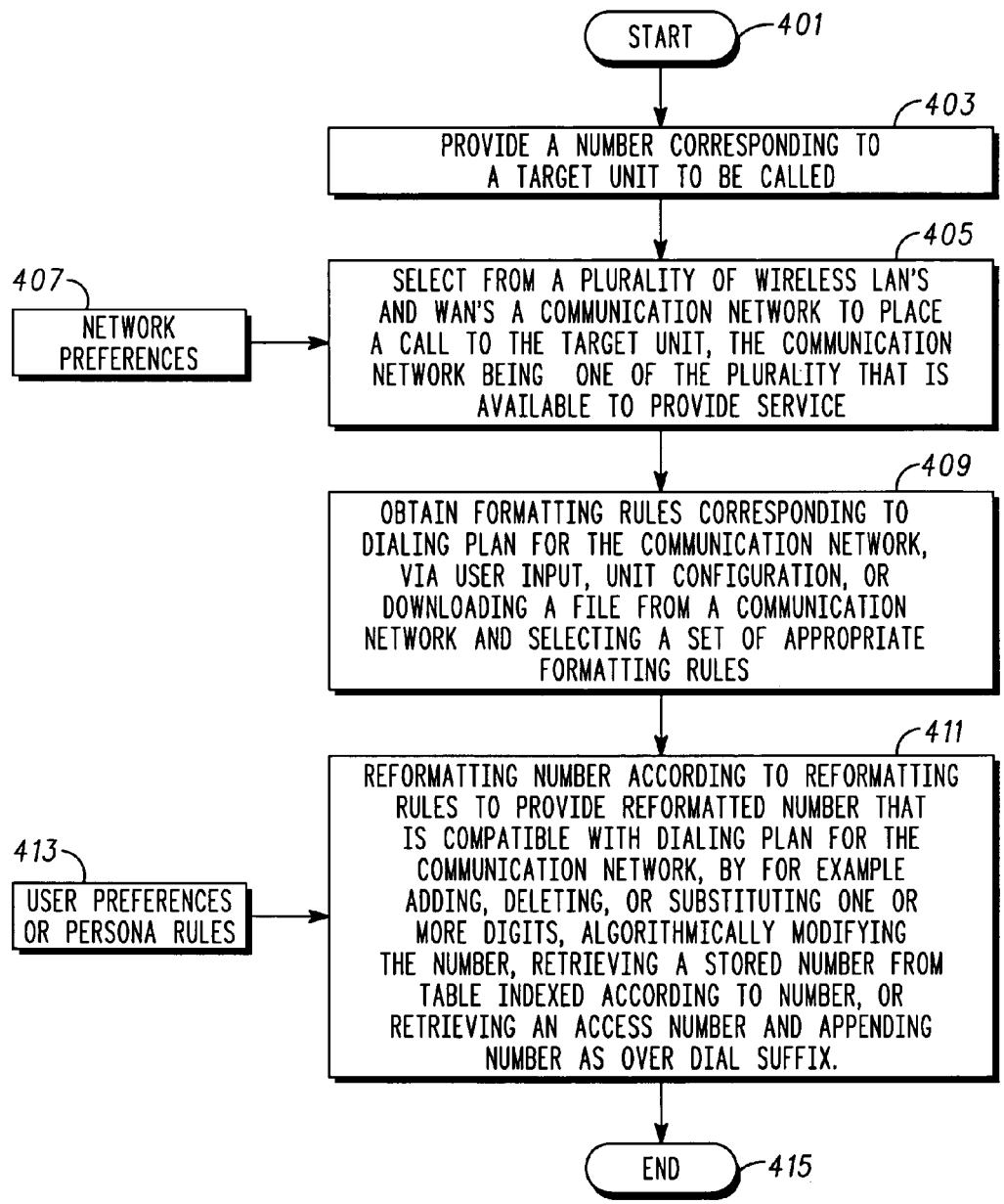
FIG. 4 is a method of reformatting dialed numbers where a selection of a communication network to provide service is made.

Referring to FIG. 4, a method of reformatting dialed numbers where a selection of a communication network to provide service is made will be discussed and described. Note that this method can be practiced in the communication unit as described above as well as other apparatus, provided that similar functionality is available. Further note that some of the discussion below will be a review of concepts and principles introduced above and the reader is referred to those discussions if additional detail is desired. The method begins at 401 and then 403, shows providing, for example at a wireless communication unit 101 that is suitable for operation over a wireless local area network (LAN) and a wireless wide area network (WAN), a number corresponding to a target unit to be called. Next at 405 the method includes selecting one of the wireless LAN and the wireless WAN as a communication network that will be used to place a call to the target unit, the communication network being one of a portion of the plurality of such networks that is available to provide such services. Note that this selection can rely on network preferences 407 as noted above. The method at 409 shows obtaining formatting rules corresponding to a dialing plan for the communication network, via user input, unit configuration information, or downloading a file from a communication network and selecting a set of appropriate reformatting rules. Lastly the method at 411 includes reformatting the number according to the reformatting rules to provide a reformatted number that is compatible with the dialing plan for the communication network that will be used to place the call to the target unit. The reformatting, for example, includes one or more of adding, deleting, or substituting one or more digits, algorithmically altering or modifying the number, retrieving a stored number from a table indexed according to the number, or retrieving an access number for the communication network and appending the number as an over dial suffix to the retrieved number. The reformatting or reformatting rules can rely on user preferences, such as discussed above, or persona rules 413, where a persona would correspond to a set of preferences, e.g. a "nomad" persona could always choose a visited network rules, a "home body" could always choose to reformat the number to route the call to a target unit at or within the home network regardless of what network was or used to be the communication network, or a "team player" might choose to always route the call to a target unit in a particular network, such as a network associated with the team. The method ends at 415.

Figure 5:
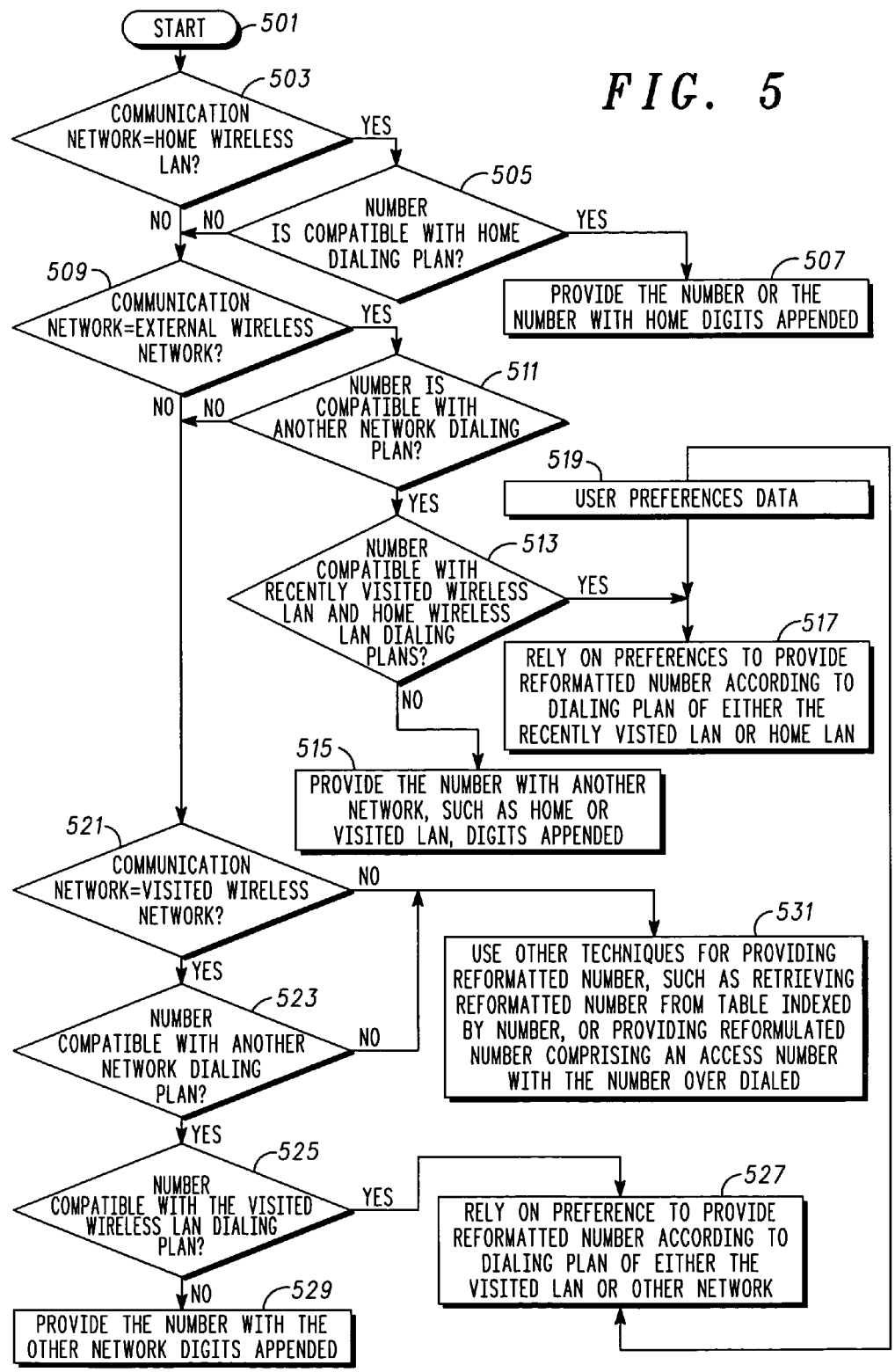
FIG. 5 shows further detail corresponding to the method of FIG. 4.

Referring to FIG. 5, a flow chart showing further detail corresponding to the method of FIG. 4 will be discussed and described. The method of FIG. 5 is indicative of additional processes that can be included in various alternative embodiments of the method discussed with reference to FIG. 4. The method begins at 501 and at 503 it is determined whether the communication network is a home wireless LAN. If so, at 505, the method determines whether the number is an abbreviated number that is compatible with the dialing plan for the home wireless LAN. If so, 507 shows reformatting the number to provide either the number or the number with appended home network digits as the reformatted number. If the results of either 503 or 505 is negative the method proceeds to 509.

At 509 it is determined whether the communication network is an external wireless network, for example a WAN and if so, whether the number is an abbreviated number that is compatible with the dialing plan of another wireless communication network 511. If so, 513 determines whether the number is an abbreviated number that is compatible with the dialing plan of a recently visited wireless LAN and is further compatible with a dialing plan for a home wireless LAN. If not, 515 indicates that reformatting the number comprises appending digits to the number so the reformatted number can be used to route the call to the other wireless communication network, e.g. the home LAN or visited LAN, etc. If the result of 513 is positive, then user preferences 519 are relied on to provide the reformatted number according to one of the dialing plan of the recently visited wireless LAN and the dialing plan of the home wireless LAN so the reformatted number can be used to route the call to a respective one of the recently visited wireless LAN and the home wireless LAN at 517.

When the result of 509 or 511 is negative, 521 determines whether the communication network is a visited wireless LAN; and if so at 523 whether the number is an abbreviated number that is compatible with a dialing plan of an other wireless communication network, such as the home wireless LAN or other LAN. If so, 525 determines whether the number is not compatible with a dialing plan of the visited wireless LAN, and if not compatible, 529 shows that reformatting the number comprises appending digits to the number so the reformatted number can be used to route the call to the other wireless communication network. However, when the abbreviated number is compatible with a dialing plan of the visited wireless LAN at 525 and thus is further compatible with the dialing plan of the other wireless communication network at 523, reformatting the number relies on a preference 519 to provide the reformatted number at 527 according to one of the dialing plan of the visited wireless LAN and the dialing plan of the other wireless communication network. In this manner the reformatted number can be used to route the call within a respective one of the visited wireless LAN and the other wireless communication network.

When the response from either 521 or 523 is negative, 531 shows that when the number is an abbreviated number and when the abbreviated number is not compatible with a dialing plan for the communication network, reformatting the number comprises one of a) applying an algorithm to the abbreviated number, b) retrieving an access number and appending the abbreviated number as an over dial suffix, and c) retrieving a stored number from a look up table that is indexed according to the abbreviated number.

Figure 6:
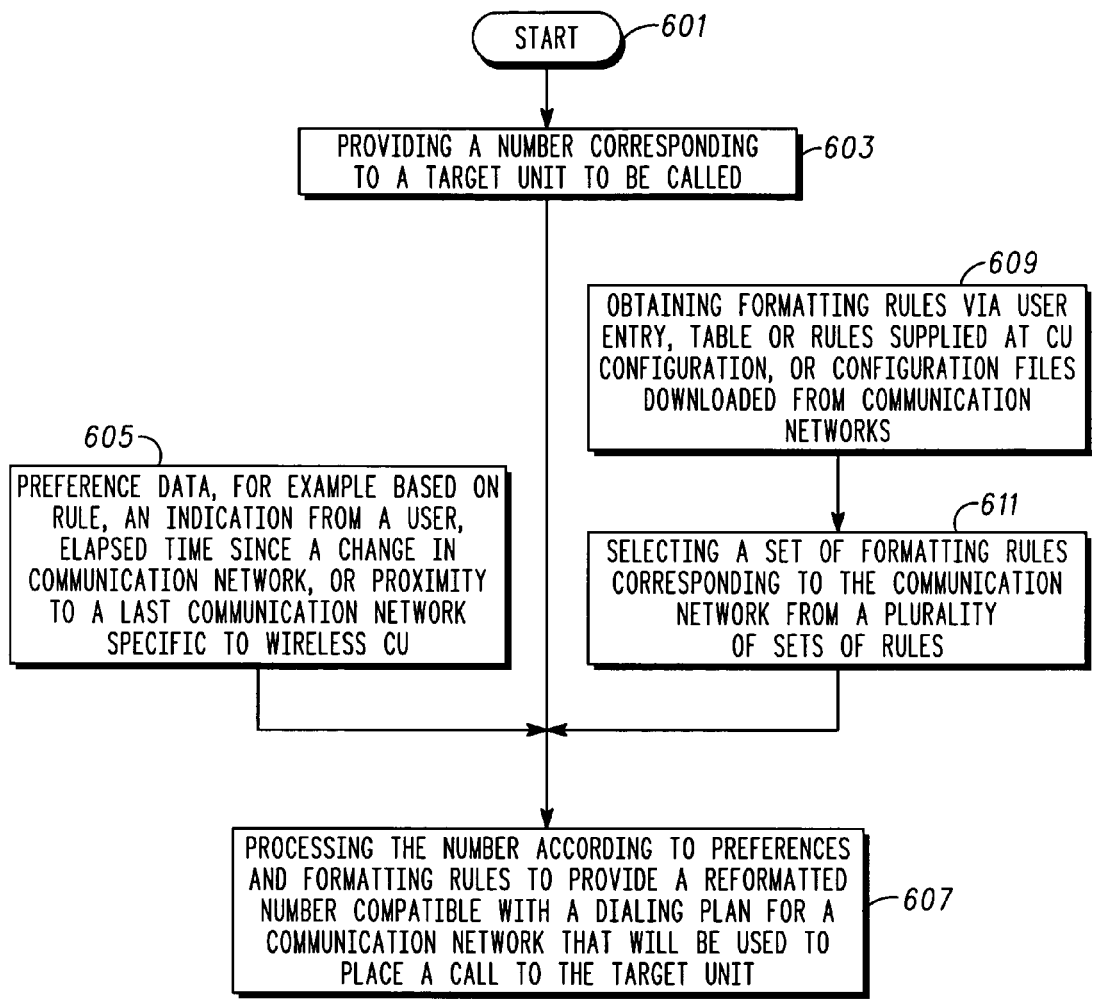
FIG. 6 is a method for reformatting numbers when user preferences are considered.

Referring to FIG. 6 an embodiment of a method for reformatting numbers when user preferences are considered is discussed and described, where many of the detailed concepts and principles noted above may be applied. The FIG. 6 method of reformatting dialed numbers begins at 601 and can be practiced in various embodiments, for example, in a wireless communication unit, such as the communications unit 101 or the like and operates according to or in accordance with dialing plans for a plurality of communication networks. At 603, the method comprises providing a number corresponding to a target unit to be called where the number can be a number dialed by a user or retrieved for example from a memory of or associated with a communications unit. At 607 the method further includes processing the number, according to one or more preferences that are specific to the wireless communication unit or user thereof, to provide a reformatted number that is compatible with a dialing plan for a communication network that will be used to place a call to the target unit. The processing can occur in the wireless communication unit or an associated infrastructure entity such as a PBX for the communication network.

In some embodiments, the preference data is supplied at 605 by, for example one or more of a rule stored in memory, an indication from a user, and can consider elapsed time since a change in the communication network, or proximity to a last communication network and this preference information is likely specific to the wireless communication unit or user thereof. Similarly in other embodiments the method includes, at 609, obtaining formatting rules via user input or entry, tables or rules supplied at the communication unit configuration process or configuration files downloaded from a communication network(s). Then at 611 other embodiments include selecting a set of formatting rules corresponding to the communication network from a plurality of sets of these rules and then using the selected set of rules for the formatting rules at 607. Note also that much of the process discussed above or portions of the process discussed with reference to FIG. 5 can also be applied in the embodiments depicted by FIG. 6.

The processes, apparatus, and systems, discussed above, and the inventive principles thereof are intended to alleviate problems and inconveniences suffered by users that result from the operation of a communication unit with multiple communication networks having differing dialing plans. Using these principles of reformatting a number presented at the communication unit in accordance with dialing plans or reformatting rules for a communication network that is being used to place a call to a target unit so as to route the call via another communication network facilitates both the usefulness of making calls on either network and of correctly reaching the called party. The inventive use preferences for selecting a network to use to place a call and to select and apply appropriate formatting rules in order to provide a reformatted number according to a required format helps to shield users of the communication unit from the need to know what communication network is actually supporting a proposed outgoing call.

Various embodiments of a method and apparatus, communication unit, for providing properly formatted numbers when operating on a plurality of communication networks to the significant advantage of a user thereof have been discussed and described. It is expected that these embodiments or others in accordance with the present invention will have application to many combinations of wide area and local area communication networks that provide for mobility of their user or subscriber communication units between such communication networks. The disclosure extends to the constituent elements or equipment comprising such systems and specifically the methods employed thereby and therein. Using the inventive principles and concepts disclosed herein advantageously allows or provides increased flexibility and utility for users wishing to take advantage of the coverage and economic benefits of using communication units capable of operating on a plurality of communication networks, particularly a mix of wireless WANs and LANs.

This disclosure is intended to explain how to fashion and use various embodiments in accordance with the invention rather than to limit the true, intended, and fair scope thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit operable to reformat dialed numbers according to dialing plans for a plurality of communication networks, the wireless communication unit comprising:
    a transceiver configured to communicate over a wireless local area network (LAN) and a wireless wide area network (WAN), wherein the LAN has a LAN dialing plan and the WAN has a WAN dialing plan;
    a user interface operable to provide a number corresponding to a target unit to be called;
    a controller, coupled to the transceiver and the user interface, configured:
        to select a communication network from among the wireless LAN communication network and the wireless WAN communication network by determining which of the wireless LAN communication network and the wireless WAN communication network the wireless communication unit is located, wherein the selected communication network is a home wireless LAN having a home wireless LAN dialing plan and wherein the selected communication network will be used to place a call to the target unit;
        to select a set of reformatting rules corresponding to the dialing plan of the selected communication network wherein the set of reformatting rules is one of a plurality of sets of reformatting rules;
        to reformat the number according to the reformatting rules when the number is an abbreviated number that is compatible with the home wireless LAN dialing plan to provide the number with appended home network digits as the reformatted number; and
        to place the call to the target unit using the reformatted number over the selected one of the wireless LAN and the wireless WAN communication network, and
    a memory that is arranged to store the reformatting rules.

2. The wireless communication unit of claim 1 wherein the controller provides the reformatted number according to the reformatting rules where the reformatted number further comprises the number with one of a digit deleted, a digit added, and a digit substituted.

3. The wireless communication unit of claim 1 wherein the reformatting rules are obtained in part by one of a user entry at the user interface, a table of rules provided during configuration of the wireless communication unit, and a configuration file provided by the selected communication network.

4. A wireless communication unit operable to reformat dialed numbers according to dialing plans for a plurality of communication networks, the wireless communication unit comprising:
    a transceiver configured to communicate over a wireless local area network (LAN) and a wireless wide area network (WAN), wherein the LAN has a LAN dialing plan and the WAN has a WAN dialing plan;
    a user interface operable to provide a number corresponding to a target unit to be called;
    a controller coupled to the transceiver and the user interface, configured:
        to select a communication network from among the wireless LAN communication network and the wireless WAN communication network by determining which of the wireless LAN communication network and the wireless WAN communication network is located, wherein the selected communication network is an external network and will be used to place a call to the target unit;
        to select a set of reformatting rules corresponding to the dialing plan of the selected communication network wherein the set of reformatting rules is one of a plurality of sets of reformatting rules;
        to reformat the number according to the reformatting rules when the number is an abbreviated number that is compatible with a dialing plan of an other wireless communication network to provide the number with appended digits as the reformatted number so that the reformatted number can be used to route the call to the other wireless communication network; and
        to place the call to the target unit using the reformatted number over the selected one of the wireless LAN and the wireless WAN communication network, and
    a memory that is arranged to store the reformatting rules.

5. The wireless communication unit of claim 4 wherein the controller provides the reformatted number according to the reformatted rules where the reformatted number further comprises the number with one of a digit deleted, a digit added, and a digit substituted.

6. The wireless communication unit of claim 4 wherein the reformatted rules are obtained in part by one of a user entry at the user interface, a table of rules provided during configuration of the wireless communication unit, and a configuration file provided by the selected communication network.

7. A wireless communication unit operable to reformat dialed numbers according to dialing plans for a plurality of communication networks, the wireless communication unit comprising:
    a transceiver for transmitting and receiving via any of the plurality of communication networks;
    a user interface operable to provide a number corresponding to a target unit to be called; and
    a controller, coupled to the transceiver and the user interface, to provide a reformatted number corresponding to the number and according to a preference that is specific to the wireless communication unit, where the reformatted number is compatible with a dialing plan for a selected communication network that will be used to place a call to the target unit wherein the selected communication network is selected from among the plurality of communication networks and is an external network and is selected by the controller determining which of the plurality of communication networks within which the wireless communication unit is located, and when the number is an abbreviated number that is compatible with a dialing plan of a recently visited network and is further compatible with a dialing plan for a second network, the controller relies on the preference to provide the reformatted number according to one of the dialing plan of the recently visited network and the dialing plan of the second network so the reformatted number can be used to route the call to a respective one of the recently visited network and the second network.

8. The wireless communication unit of claim 7 further comprising a memory arranged to store the preference and formatting rules, wherein the preference corresponds to a set of the formatting rules that are chosen and wherein the controller provides the reformatted number by applying the set of the formatting rules that are chosen to the number.

9. The wireless communication unit of claim 8 wherein the formatting rules are obtained by one of a user entry at the user interface, a table of rules provided during configuration of the wireless communication unit, and a configuration file provided via the selected communication network.

10. The wireless communication unit of claim 7 wherein the number is an abbreviated number and when the abbreviated number is not compatible with a dialing plan for the selected communication network, the controller operates to provide the reformatted number by one of a) applying an algorithm to the abbreviated number, b) retrieving an access number and appending the abbreviated number as an over dial suffix, and c) retrieving a stored number from a look up table that is indexed according to the abbreviated number.

11. A wireless communication unit operable to reformat dialed numbers according to dialing plans for a plurality of communication networks, the wireless communication unit comprising:

a transceiver for transmitting and receiving via any of the plurality of communication networks;

a user interface operable to provide a number corresponding to a target unit; to be called; and a controller, coupled to the transceiver and the user interface, to provide a reformatted number corresponding to the number and according of a preference that is specific to the wireless communication unit, where the reformatted number is compatible with a dialing plan for a selected communication network that will be used to place a call to the target unit wherein the selected communication network is selected from among the plurality of communication networks and is a visited network and is selected by the controller determining which of the plurality of communication networks within which the wireless communication unit is located and;

when the number is an abbreviated number that is compatible with a dialing plan of an other communication network and not compatible with a dialing plan of the visited network, the controller appends digits to the number so the reformatted number can be used to route the call to the other communication network; and when the abbreviated number is compatible with a dialing plan of the visited network and is further compatible with the dialing plan of the other communication network, the controller relies on the preference to provide the reformatted number according to one of the dialing plan of the visited network and the dialing plan of the other communication network so the reformatted number can be used to route the call within a respective one of the visited network and the other network.

12. The wireless communication unit of claim 11 further comprising a memory arranged to store the preference and formatting rules, wherein the preference corresponds to a set of to formatting rules that are chosen and wherein the controller provides the reformatted number by applying the set of the formatting rules that are chosen to the number.

13. The wireless communication unit of claim 11 wherein the formatting rules are obtained by one of a user entry at the user interface, a table of rules provided during configuration of the wireless communication unit, and a configuration file provided via the selected communication network.

14. The wireless communication unit of claim 11 wherein the number is an abbreviated number and when the abbreviated number is not compatible with a dialing plan for the selected communication network, the controller operates to provide the reformatted number by one of a) applying an algorithm to the abbreviated number, b) retrieving an access number and appending the abbreviated number as an over dial suffix, and c) retrieving a stored number from a look up table that is indexed according to the abbreviated number.

15. A wireless communication unit operable to reformat dialed numbers according to dialing plans for a plurality of communication networks, the wireless communication unit comprising:

a transceiver for transmitting and receiving via any of the plurality of communication networks;

a user interface operable to provide a number corresponding to a target unit to be called; and a controller, coupled to the transceiver and the user interface, to provide a reformatted number corresponding to the number and according of a preference that is specific to the wireless communication unit where the reformatted number is compatible with a dialing plan for a selected communication network that will be used to place a call to the target unit wherein the selected communication network is selected from among the plurality of communication networks and is a home network and is selected by the controller determining which of the plurality of communication networks within which the wireless communication unit is located and when the number is an abbreviated number that is compatible with the dialing plan for the home network, the controller provides the number with appended home network digits as the reformatted number.

16. A wireless communication unit operable to reformat dialed numbers according to dialing plans for a plurality of communication networks, the wireless communication unit comprising:

a transceiver for transmitting and receiving via any of the plurality of communication networks;

a user interface operable to provide a number corresponding to a target unit to be called; and a controller, coupled to the transceiver and the user interface, to provide a reformatted number corresponding to the number and according to a preference that is specific to the wireless communication unit, where the reformatted number is compatible with a dialing plan for a selected communication network that will be used to place a call to the target unit wherein the selected communication network is selected from among the plurality of communication networks and is an external network and is selected by the controller determining which of the plurality of communication networks within which the wireless communication unit is located and when the number is an abbreviated number that is compatible with the dialing plan of an other communication network, the controller appends digits to the number so the reformatted number can be used to route the call to the other communication network.

17. A method of reformatting dialed numbers according to dialing plans for a plurality of communication networks, the method comprising:

provding, at a wireless communication unit suitable for operation over a wireless local area network (LAN) having a wireless LAN dialing plan and a wireless wide area network (WAN) having a wireless WAN dialing plan, a number corresponding to a target unit to be called;

selecting one of the wireless LAN and the wireless WAN as a selected communication network that will be used to place a call to the target unit wherein the selected communication network is selected by determining within which of among the wireless LAN and the wireless WAN the communication is located, wherein the selected communication network is a home wireless LAN;

obtaining formatting rules corresponding to the dialing plan for the selected communication network;

reformatting the number when the number is an abbreviated number that is compatible with the dialing plan for the home wireless LAN according to the reformatting rules to provide the number with appended home network digits as a reformatted number that is compatible with the dialing plan for the communication network that will be used to place the call to the target unit; and placing, by the wireless communication unit, the call to the target unit over the communication network.

18. The method of claim 17 wherein the reformatting the number further comprises providing the reformatted number according to reformatting rules that are applied to the number, where the reformatted number further comprises the number with one of a digit deleted, a digit added, and a digit substituted.

19. The method of claim 17 wherein the obtaining the formatting rules further comprises obtaining the formatting rules in part from one entering the formatting rules at a user interface, configuring the wireless communication unit with a table of rules, and downloading a configuration file from the selected communication network.

20. A method of reformatting dialed numbers according to dialing plans for a plurality of communication networks, the method comprising:

providing, at a wireless communication unit suitable for operation over a wireless local area network (LAN) having a wireless LAN dialing plan and a wireless wide area network (WAN) having a WAN dialing plan, a number corresponding to a target unit to be called;

selecting at least one of the wireless LAN and the wireless WAN as a communication network that will be used to place a call to the target unit wherein the selected communication network is selected by determining within which of among the wireless LAN and the wireless WAN the communication is located;

obtaining formatting rules corresponding to the dialing plan for the selected communication network;

reformatting the number when the number is an abbreviated number that is compatible with the dialing plan of an other wireless communication network, the reformatting the number comprises appending digits to the number so the reformatted number can be used to route the call to the other wireless communication network; and place, by the wireless communication network, the call to the target unit over the communication network.

* * * * *